United States Patent
Tachiki et al.

(10) Patent No.: US 8,602,208 B2
(45) Date of Patent: Dec. 10, 2013

(54) BELT CONVEYANCE DEVICE

(71) Applicant: Sharp Kabushiki Kaisha, Osaka (JP)

(72) Inventors: Hiroshi Tachiki, Osaka (JP); Shohtaroh Okamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/655,070

(22) Filed: Oct. 18, 2012

(65) Prior Publication Data

US 2013/0098739 A1    Apr. 25, 2013

(30) Foreign Application Priority Data

Oct. 24, 2011  (JP) ................................ 2011-232413

(51) Int. Cl.
  *B65G 23/44*  (2006.01)
(52) U.S. Cl.
  USPC .......................................... 198/813; 399/165
(58) Field of Classification Search
  USPC ............ 198/813, 814, 815, 810.03; 399/165, 399/303
  See application file for complete search history.

(56) References Cited

U.S. PATENT DOCUMENTS

| | | | | |
|---|---|---|---|---|
| 6,088,557 A | * | 7/2000 | Janssen et al. | 399/165 |
| 6,104,899 A | * | 8/2000 | Hokari et al. | 399/165 |
| 6,249,661 B1 | * | 6/2001 | Saitoh et al. | 399/117 |
| 6,685,009 B1 | * | 2/2004 | Hosch et al. | 198/813 |
| 7,806,253 B2 | * | 10/2010 | Graswinckel et al. | 198/806 |
| 8,351,831 B2 | * | 1/2013 | Hori et al. | 399/303 |
| 2006/0159489 A1 | * | 7/2006 | Ishii et al. | 399/165 |
| 2010/0247174 A1 | * | 9/2010 | Hori et al. | 399/303 |

FOREIGN PATENT DOCUMENTS

| | | |
|---|---|---|
| JP | 10-260590 A | 9/1998 |
| JP | 2010-231111 A | 10/2010 |
| JP | 2011-107533 A | 6/2011 |

* cited by examiner

*Primary Examiner* — James R Bidwell
(74) *Attorney, Agent, or Firm* — Renner, Otto, Boisselle & Sklar, LLP

(57) ABSTRACT

An intermediate transfer unit includes a shaft, a joint member, an apparatus frame and a supporting member. The joint member includes a first concave portion in which a first end portion in a longitudinal direction of the shaft is fittable at a plurality of angles around a first axis of the shaft, and a first peripheral portion having a second axis that is parallel to but does not share the same straight line with the first axis. The apparatus frame has a through hole. The supporting member has a second concave portion which the first peripheral portion is attachable to and removable from at a plurality of angles around the second axis, and is insertable into and removable from the through hole in the longitudinal direction.

5 Claims, 9 Drawing Sheets

BELT CONVEYANCE DEVICE

CROSS REFERENCE

This Nonprofisional application claims priority under 35 U.S.C. §119(a) on Patent Application No. 2011-232413 filed in Japan on Oct. 24, 2011, the entire contents of which are hereby incorporated by reference.

BACKGROUND OF THE INVENTION

The present invention relates to a belt conveyance device configured so as to permit changing an endless belt.

Among belt conveyance devices are ones in which a loop-like path of movement is formed from a rotating endless belt passed over and tensioned with a plurality of tension rollers including a drive roller and an idle roller. Such a belt conveyance device is applied, for example, in an image forming apparatus utilizing the electrophotography method, to an intermediate transfer unit that conveys a full-color toner image, which is made up through a series of primarily transfers performed in such a manner that toner images of respective hues from each of a plurality of image forming sections are sequentially superimposed onto an intermediate transfer belt, to a secondary transfer position where a secondary transfer of the full-color toner image is performed onto a paper sheet, and is also applied to a secondary transfer unit including a secondary transfer belt that conveys the paper sheet to the secondary transfer position, and so forth.

In the belt conveyance device, it is important to suppress meandering of the endless belt in order to prevent the occurrence of a positional deviation of the image in relation to the paper sheet. In the case where the endless belt is passed over the drive roller and the idle roller and tensioned therewith, the meandering of the endless belt is more influenced when one end portion of the idle roller is displaced in a direction perpendicular to a conveyance direction of the endless belt between the drive roller and the idle roller than when it is displaced along the conveyance direction.

Among the conventional belt conveyance devices are ones in which in an attempt to suppress the meandering of the endless belt passed over with tension in a horizontal direction the amount of the meandering of the endless belt is detected with a sensor and then a position in the upward and downward direction of the one end portion of the idle roller tensioning the endless belt is adjusted depending on the result of the detection. As for a configuration that permits the adjustment of the position in the upward and downward direction of the one end portion of the idle roller, known is one that allows changing a rotational angle of an eccentric cam in contact with one end portion of a shaft of the idle roller from underside (for example, refer to Japanese Patent Unexamined Publication No. 10-260590 bulletin).

In the conventional belt conveyance device, however, it has been necessary to remove the eccentric cam from a main body section of the belt conveyance device whenever a replacement of the endless belt has to be made; and when the eccentric cam is removed once, the eccentric cam is not restored correctly to its original rotational angle even when it is installed again after the replacement of the belt is made; so that it can occur that the position in the upward and downward direction of the one end portion of the idle roller deviates from a state prior to the disassembly. The positional deviation in the upward and downward direction of the one end portion of the idle roller causes the endless belt to meander.

The present invention is directed to providing a belt conveyance device that permits correctly restoring a position of an idle roller in a direction perpendicular to a conveyance direction of an endless belt between a plurality of tension rollers which the endless belt is passed over and tensioned with, when a replacement of the endless belt is made.

SUMMARY OF THE INVENTION

A belt conveyance device of the present invention comprises a shaft, a joint member, an apparatus frame and a supporting member. The shaft rotatably supports an idle roller as one of a plurality of tension rollers which an endless belt is passed over and tensioned with. The joint member includes a first concave portion into which one end portion in a longitudinal direction of the shaft is fittable at a plurality of angles around a first axis of the shaft, and a first peripheral portion having a second axis that is parallel to but does not share the same straight line with the first axis. The apparatus frame is provided with a through hole penetrating in the longitudinal direction. The supporting member, having a second concave portion which the first peripheral portion is attachable to and detachable from at a plurality of angles around the second axis, and being insertable into and removable from the through hole in the longitudinal direction, is held at a predetermined position in the apparatus frame in a direction perpendicular to a conveying direction of the endless belt between a plurality of tension rollers when it is inserted into the through hole.

In this configuration, the one end portion of the shaft of the idle roller is fitted into the first concave portion of the joint member. After it is fitted, the joint member is constrained from rotating around the first axis in relation to the shaft. An axis of the first concave portion and the first axis of the shaft coincide. The second axis of the first peripheral portion of the joint member and the axis of the first concave portion of the joint member are parallel with each other, but are not in the same straight line. That is to say, the first concave portion and the first peripheral portion are eccentric between each other. Also, when inserted into the through hole, the supporting member is held at the predetermined position in the apparatus frame in the direction perpendicular to the conveyance direction of the endless belt between the plurality of tension rollers. Further, because neither the idle roller nor the tension roller opposed thereto is displaced, the joint member does not rotate around the first axis in a state where it is fitted onto the shaft. As a result, the position of the one end portion of the idle roller in the perpendicular direction can be adjusted by an angle around the first axis at which the shaft is fitted into the first concave portion. That is to say, the position of the one end portion of the idle roller in the perpendicular direction is adjusted by fitting the first concave portion onto the one end portion of the shaft after having adjusted an angle of the first concave portion around the first axis in relation to the one end portion of the shaft, and then by inserting the first peripheral portion into the second concave portion; and meandering of the endless belt is suppressed thereby.

Further, when a replacement of the endless belt is made, the joint member is removed from the supporting member in a state where it is fitted onto the shaft, and is inserted into the supporting member again after the replacement of the endless belt. In doing so, the joint member and the shaft are not disassembled, so that the joint member does not rotate around the first axis in the state where it is fitted onto the shaft; therefore, the position of the shaft in the perpendicular direction is not changed before and after the replacement of the endless belt.

The present invention makes it possible to correctly restore a position of an idle roller in a direction perpendicular to a conveying direction of an endless belt between a plurality of tension rollers which the endless belt is passed over and tensioned with when a replacement of the endless belt is made.

DETAILED DESCRIPTION OF THE INVENTION

Figure 1:
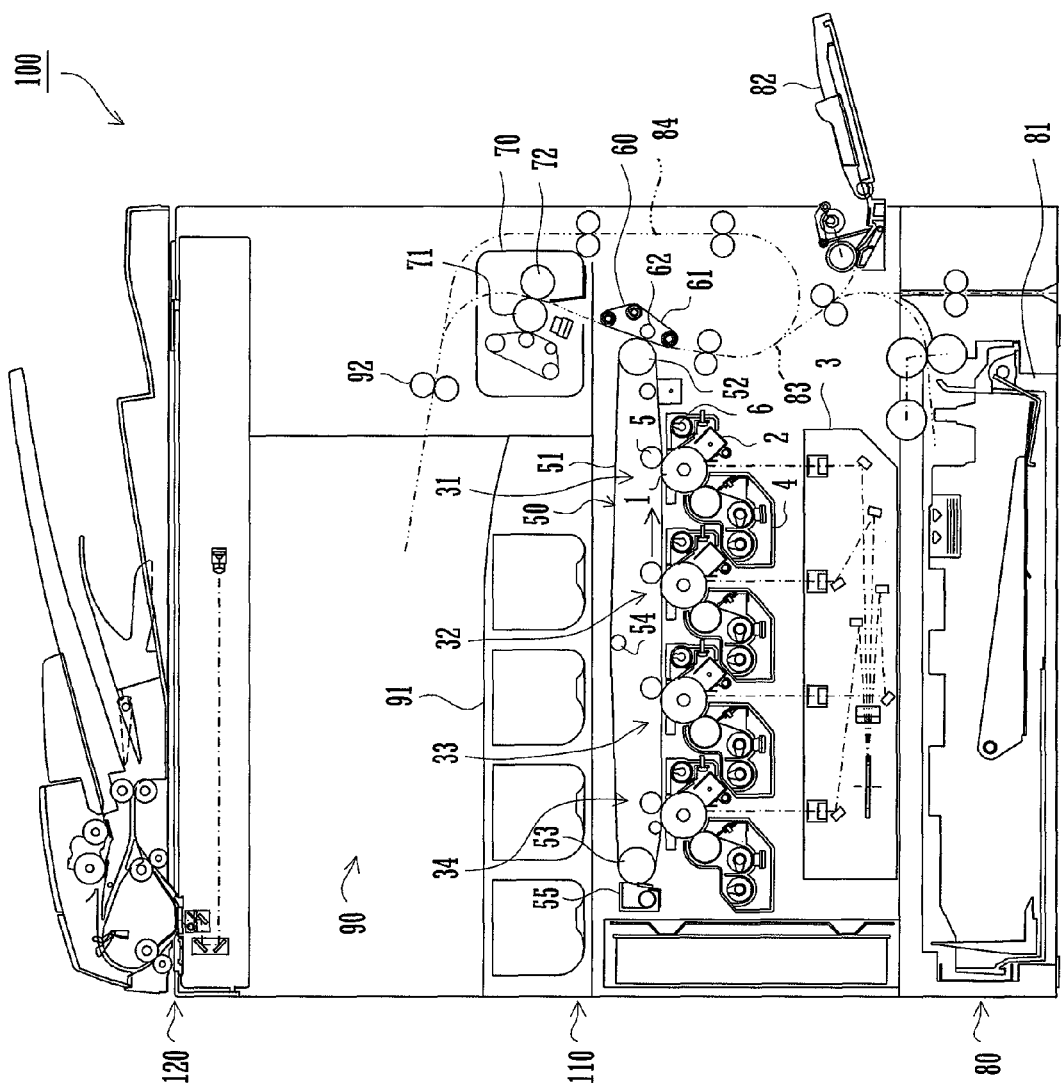
FIG. 1 is a general front sectional view of an image forming apparatus provided with an intermediate transfer unit according to an embodiment of a belt conveyance device of the present invention.

An embodiment of the present invention is explained below referring to the drawings. As shown in FIG. 1, an image forming apparatus 100 forms a multicolored or a monochromatic image onto a paper sheet based on image data that have been produced from a document or image data inputted from outside. For the paper, normal paper, photographic paper, and sheet recording medium such as OHP film or the like can be exemplified.

The image forming apparatus 100 includes an image reading section 120, an image forming section 110, a paper feeding section 80 and a paper discharge section 90.

The image reading section 120 reads an image of the document, thereby produces image data, and supplies thereof to the image forming section 110.

The image forming section 110 includes an exposure unit 3, four image forming stations 31, 32, 33, 34, an intermediate transfer unit 50, a secondary transfer unit 60 and a fuser unit 70, and performs an image forming process onto a paper sheet. The intermediate transfer unit 50 is an example of a belt conveyance device of the present invention.

The intermediate transfer unit 50 has an intermediate transfer belt 51, an intermediate transfer belt drive roller 52, an intermediate transfer belt idle roller 53 and an intermediate transfer belt tension roller 54. The intermediate transfer belt drive roller 52, the intermediate transfer belt idle roller 53 and the intermediate transfer belt tension roller 54 are disposed so as to be parallel to each other. The intermediate transfer belt 51, which is an endless belt, is passed over the intermediate transfer belt drive roller 52 and the intermediate transfer belt idle roller 53 and tensioned therewith, thereby forming a loop-like path of movement. The tensile force of the intermediate transfer belt 51 is variable with the intermediate transfer belt tension roller 54. The intermediate transfer belt drive roller 52, the intermediate transfer belt idle roller 53 and the intermediate transfer belt tension roller 54 are the rollers which the intermediate transfer belt 51 is passed over and tensioned therewith.

The image forming section 110 forms, at the image forming stations 31 through 34, toner images of respective hues of the four colors consisting of black, as well as cyan, magenta, and yellow which are the three primary colors of the subtractive color mixture obtained from the color separation of a color image. The image forming stations 31 through 34 are aligned along the path of movement of the intermediate transfer belt 51. The image forming stations 32 through 34 are configured substantially in the same manner as the image forming station 31.

The image forming station 31 for black includes a photoreceptor drum 1, an electrostatic charger 2, a developing device 4, an intermediate transfer roller 5 and a cleaning unit 6.

The photoreceptor drum 1, which is an electrostatic latent image bearing body, is caused to rotate in a predetermined direction by a driving force transmitted from the driving source which is not illustrated. The electrostatic charger 2 charges a circumferential surface of the photoreceptor drum 1 to a predetermined electrostatic potential.

The exposure unit 3 projects respective laser beams modulated by image data on the respective hues consisting of black, cyan, magenta and yellow onto the respective photoreceptor drums 1 of the image forming stations 31 through 34. On the circumferential surfaces of the four photoreceptor drums 1 are respectively formed electrostatic latent images based on the image data on the respective hues consisting of black, cyan, magenta and yellow.

The developing device 4 supplies the circumferential surface of the photoreceptor drum 1 with a toner of black which is the hue for the image forming station 31, thereby rendering the electrostatic latent image visible in a black toner image.

A peripheral surface of the intermediate transfer belt 51 sequentially faces the four photoreceptor drums 1. The intermediate transfer roller 5 is disposed at a position opposed to the photoreceptor drum 1 across the intermediate transfer belt 51. Each of the positions at which the intermediate transfer belt 51 and each of the photoreceptor drums 1 are opposed to each other is the position where primarily transfer is performed.

To the intermediate transfer roller 5, a primary transfer bias of a polarity (for example, plus) reverse to an electrostatic charge polarity of the toner (for example, minus) is applied with a constant voltage control. The same applies to the image forming stations 32 through 34. This causes the toner images of respective hues formed on the respective photoreceptor drums 1 to undergo primary transfers sequentially in such a manner as to be superimposed onto the peripheral surface of the intermediate transfer belt 51, thereby forming a full-color toner image on the peripheral surface of the intermediate transfer belt 41.

However, when image data on only part of the hues consisting of black, cyan, magenta and yellow are inputted, electrostatic latent image(s) and toner image(s) are formed only at part of the drums corresponding to the part of the hues of the inputted image data among the four photoreceptor drums 1, and thus only the toner image(s) of the part of the hues undergoes primary transfer(s) onto the peripheral surface of the intermediate transfer belt 51.

The cleaning unit 6 collects the toner remaining on the circumferential surface of the photoreceptor drum 1 after the primary transfer.

The toner images that have undergone the primary transfers onto the peripheral surface of the intermediate transfer belt 51 at the respective primary transfer positions are conveyed by the rotating intermediate transfer belt 51 to a secondary transfer position at which the intermediate transfer belt 51 and a secondary transfer belt 61 that is installed in the secondary transfer unit 60 are opposed to each other.

The paper feeding section 80 includes a paper feed cassette 81, a hand-fed paper tray 82, a first paper sheet conveying path 83 and a second paper sheet conveying path 84. In or on each of the paper feed cassette 81 and the hand-fed paper tray 82 are received paper sheets. The first paper conveying path 83 is configured so as to reach the paper discharge section 90 by way of the secondary transfer position and the fuser unit 70 from each of the paper feed cassette 81 and the hand-fed paper tray 82. The second paper conveying path 84, which is a paper conveying path for duplex printing, is configured in such a manner that a paper sheet onto which face on one side an image forming has been performed is conveyed again to the secondary transfer position with its faces on both sides turned.

The secondary transfer unit 60 includes a secondary transfer roller 62, in addition to the secondary transfer belt 61. The secondary transfer roller 62 is in contact with the intermediate transfer belt drive roller 52 with a predetermined nip pressure sandwiching the secondary transfer belt 61 and the intermediate transfer belt 51 in between. In order to maintain the nip pressure between the secondary transfer roller 62 and the intermediate transfer belt drive roller 52 at the predetermined value, either of the secondary transfer roller 62 and the intermediate transfer belt drive roller 52 is made of a rigid material (for example, metal or resin), and the other is made of a soft material (for example, rubber or foam resin).

When the paper sheet is conveyed by way of the secondary transfer position, a secondary transfer bias of a polarity (for example, plus) reverse to an electrostatic charge polarity (for example, minus) of the toner is applied to the secondary transfer roller 62 with a constant voltage control; and this causes the toner image borne on the peripheral surface of the intermediate transfer belt 51 to undergo a secondary transfer onto the paper sheet.

The toner remaining on the intermediate transfer belt 51 after the toner image has been transferred onto the paper sheet is collected by an intermediate transfer belt cleaning unit 55.

The paper sheet onto which the toner image has been transferred is transported to the fuser unit 70. The fuser unit 70 includes a fuser roller 71 and a pressing roller 72. The fuser unit 70 heats and presses the paper sheet by causing the fuser roller 71 and the pressing roller 72 to rotate sandwiching the paper sheet in between, thereby fixing the toner image durably on the paper sheet.

The paper discharge section 90 includes a paper receiving tray 91 and a paper discharge roller 92. The paper sheet on which the toner image has been fixed is discharged onto the paper receiving tray 91. The paper sheet is received in the paper receiving tray 91 with the face on which the toner image has been fixed facing downward.

Figure 2:
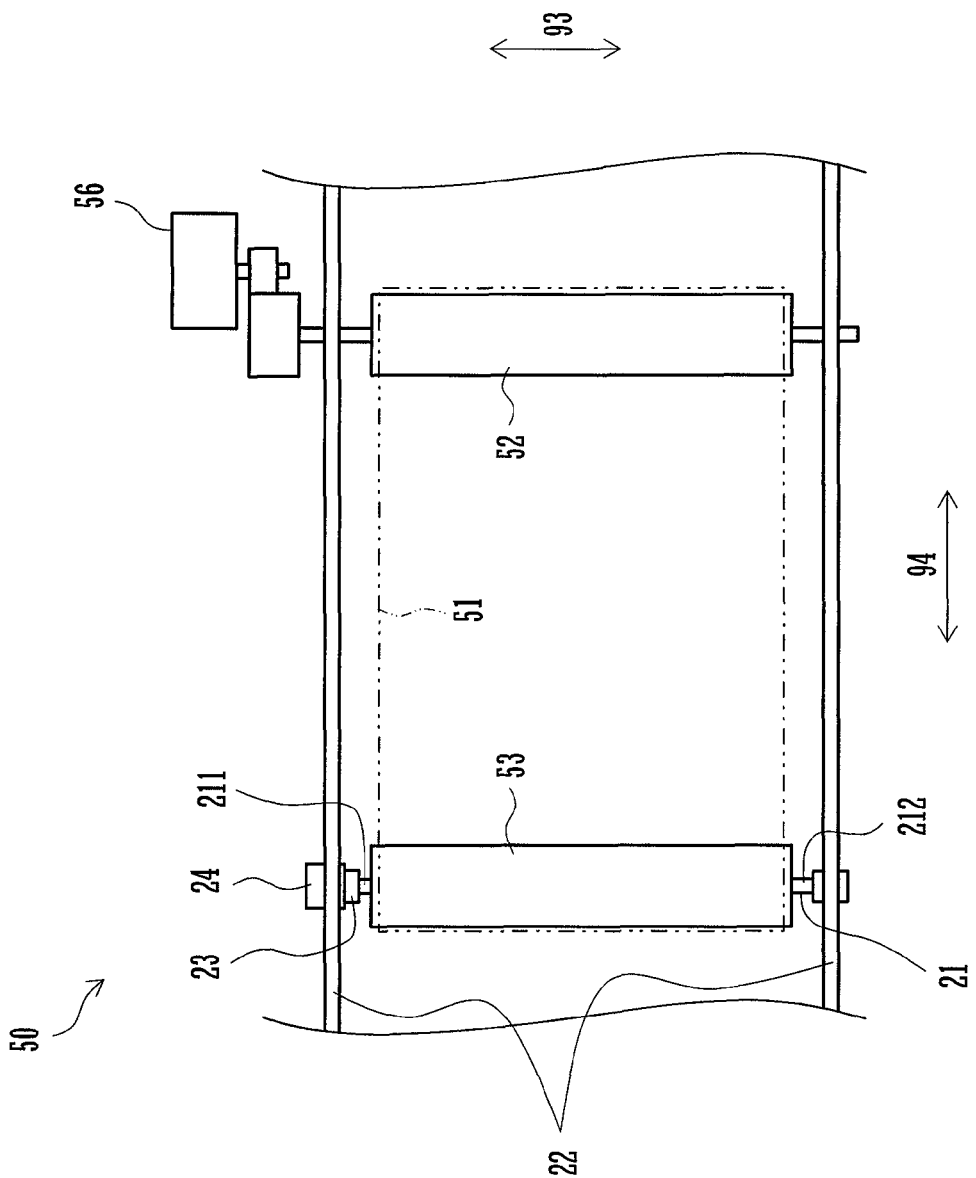
FIG. 2 is a general top view of the intermediate transfer unit.

As shown in FIG. 2, the intermediate transfer belt 51 is passed over the intermediate transfer belt drive roller 52 and the intermediate transfer belt idle roller 53 and tensioned therewith. As an example, the intermediate transfer belt drive roller 52 and the intermediate transfer belt idle roller 53 are both disposed in a generally horizontal direction, and a conveyance direction 94 of the intermediate transfer belt 51 between the intermediate transfer belt drive roller 52 and the intermediate transfer belt idle roller 53 is horizontal.

The intermediate transfer belt drive roller 52 is caused to rotate by a driving force transmitted from a drive motor 56. The intermediate transfer belt idle roller 53 is rotatably supported by a shaft 21. The shaft 21 is supported at a first end portion 211 and a second end portion 212 in a longitudinal direction 93 by an apparatus frame 22. The intermediate transfer belt 51 is caused to rotate by the rotation of the intermediate transfer belt drive roller 52. The intermediate transfer belt idle roller 53 rotates around the shaft 21 accompanying the rotation of the intermediate transfer belt 51. Even so, however, the shaft 21 itself does not rotate.

As shown in FIG. 3A through FIG. 3C and FIG. 4, the first end portion 211 of the shaft 21 is provided with engaging concave portions 213 at a plurality of positions around a first axis 95 of the shaft 21. As an example, one engaging concave portion 213 is provided every 30 degrees within a range of 180 degrees from the top to the bottom around the first axis 95, which makes a total of seven in number. The engaging concave portion 213 has a homogeneous cross section in the longitudinal direction 93 of the shaft 21. Additionally, the first end portion 211 of the shaft 21 is provided with a protrusion 214 protruding in the longitudinal direction 93. A diameter of the protrusion 214 is smaller than a diameter of a main body portion of the shaft. Axes of the protrusion 214 and the main body portion of the shaft coincide.

The first end portion 211 of the shaft 21 is supported by the apparatus frame 22 through a joint member 23 and a supporting member 24.

The joint member 23 has a first concave portion 231 and a first peripheral portion 232. The first concave portion 231 has a cross section of a perfect circular shape in the longitudinal direction 93. An axis of the first concave portion 231 coincides with the first axis 95. The first concave portion 231 is configured in such a manner that the first end portion 211 of the shaft 21 is fittable thereinto at a plurality of angles around the first axis 95. The first concave portion 231 is provided with an engaging protruded portion 233. The engaging protruded portion 233, having a homogeneous cross section in the longitudinal direction 93, is configured so as to be capable of engaging with the engaging concave portion 213. As an example, one engaging protruded portion 233 is provided.

Figure 3:
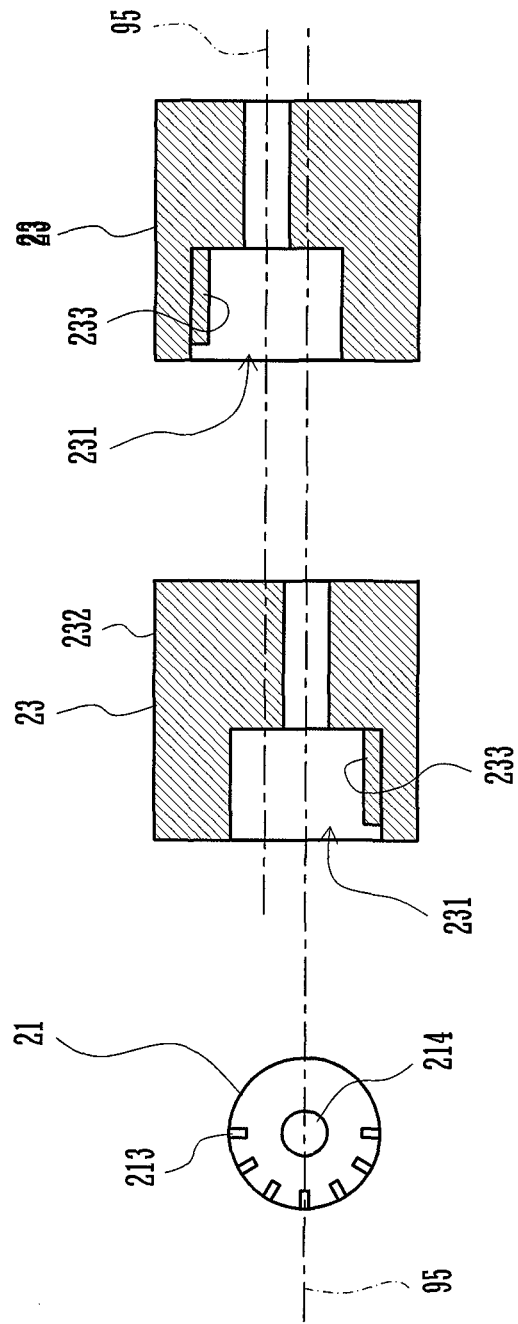
FIG. 3A is a rear view of a shaft of an idle roller installed in the intermediate transfer unit.
FIG. 3B is a side sectional view of a joint member in a state where an engaging protruded portion is disposed on the underside.
FIG. 3C is a side sectional view of the joint member in a state where the engaging protruded portion is disposed on the upper side.
Figure 4:
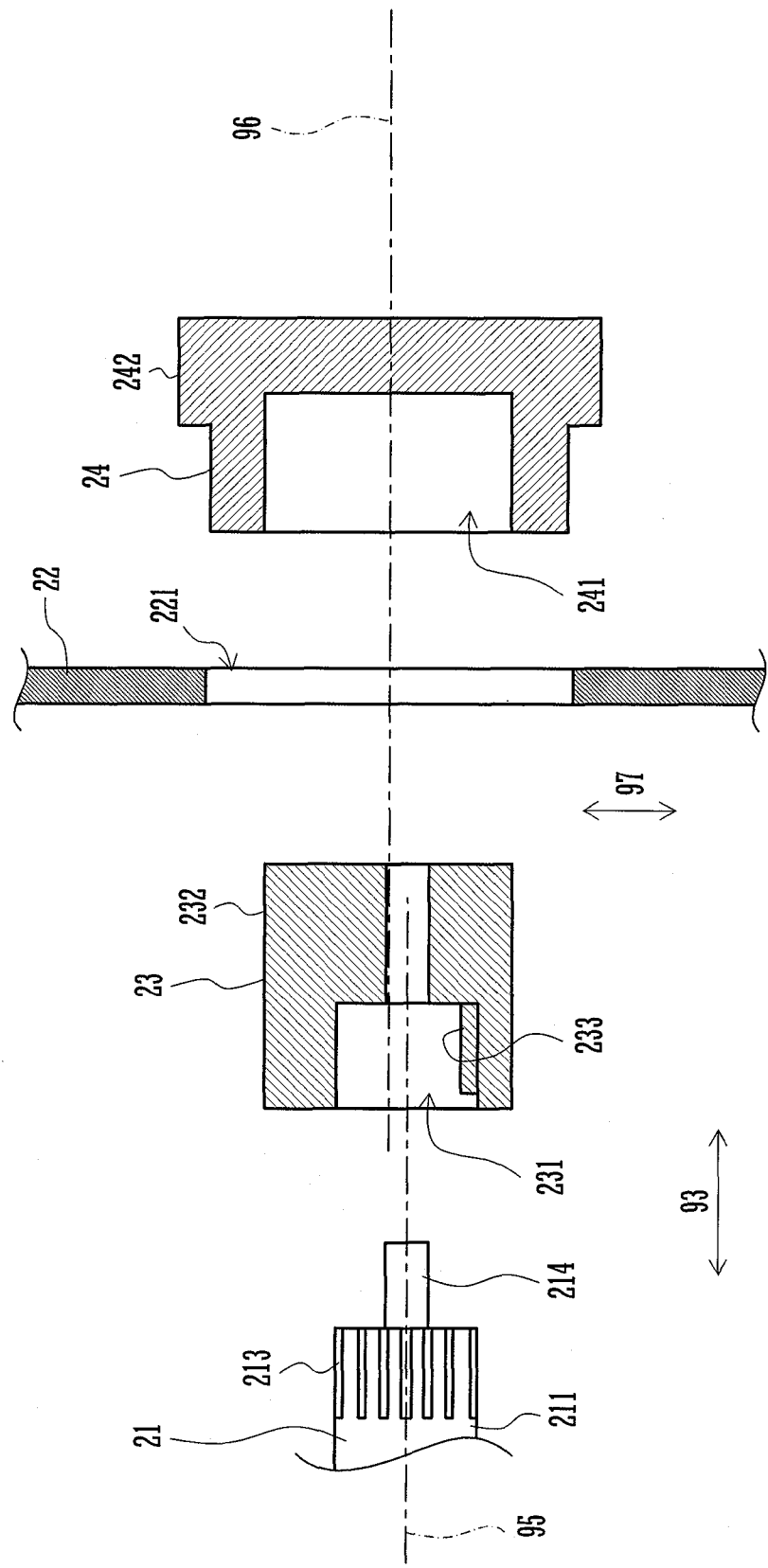
FIG. 4 is a sectional view of a disassembled state of a part of the intermediate transfer unit.

The first peripheral portion 232 has a cross section of a perfect circular shape in the longitudinal direction 93. A second axis 96 of the first peripheral portion 232 is parallel to but does not share the same straight line with the first axis 95. That is to say, the first concave portion 231 and the first peripheral portion 232 are eccentric between each other. As a result, as shown in FIG. 3B and FIG. 3C, a height of the first concave portion 231 is displaced depending on an angle around the second axis 96 at which the joint member 23 is disposed. To be specific, the height of the first concave portion 231 is displaced according to which engaging concave portion 213 out of a plurality of engaging concave portions 213 the engaging protruded portion 233 is brought to engage with. As an example, the engaging protruded portion 233 is disposed at a position farthest from the second axis 96 in the first concave portion 231.

The apparatus frame 22 is provided with a through hole 221 penetrating in the longitudinal direction 93 of the shaft 21.

The supporting member 24 has a second concave portion 241. The second concave portion 241, having a cross section of a perfect circular shape in the longitudinal direction 93, is configured in such a manner that the first peripheral portion 232 is attachable thereto and detachable therefrom at a plurality of angles around the second axis 96. The supporting member 24 is insertable into and removable from the through hole 221 in the longitudinal direction 93. When inserted into the through hole 221, the supporting member 24 is held at a predetermined position in the apparatus frame 22 in an adjustment direction 97 perpendicular to the conveyance direction 94 of the intermediate transfer belt 51 between the intermediate transfer belt drive roller 52 and the intermediate transfer belt idle roller 53. In the embodiment, the adjustment direction 97 corresponds to the height direction.

Also, the supporting member 24 has an increased diameter portion 242 at an edge portion on the opposite side of the shaft 21 with respect to the apparatus frame 22 in the longitudinal direction 93. The increased diameter portion 242 prevents the supporting member 24 from falling off the apparatus frame 22 toward the shaft 21's side when the supporting member 24 is inserted into the apparatus frame 22 from the opposite side of the shaft 21.

Figure 5:
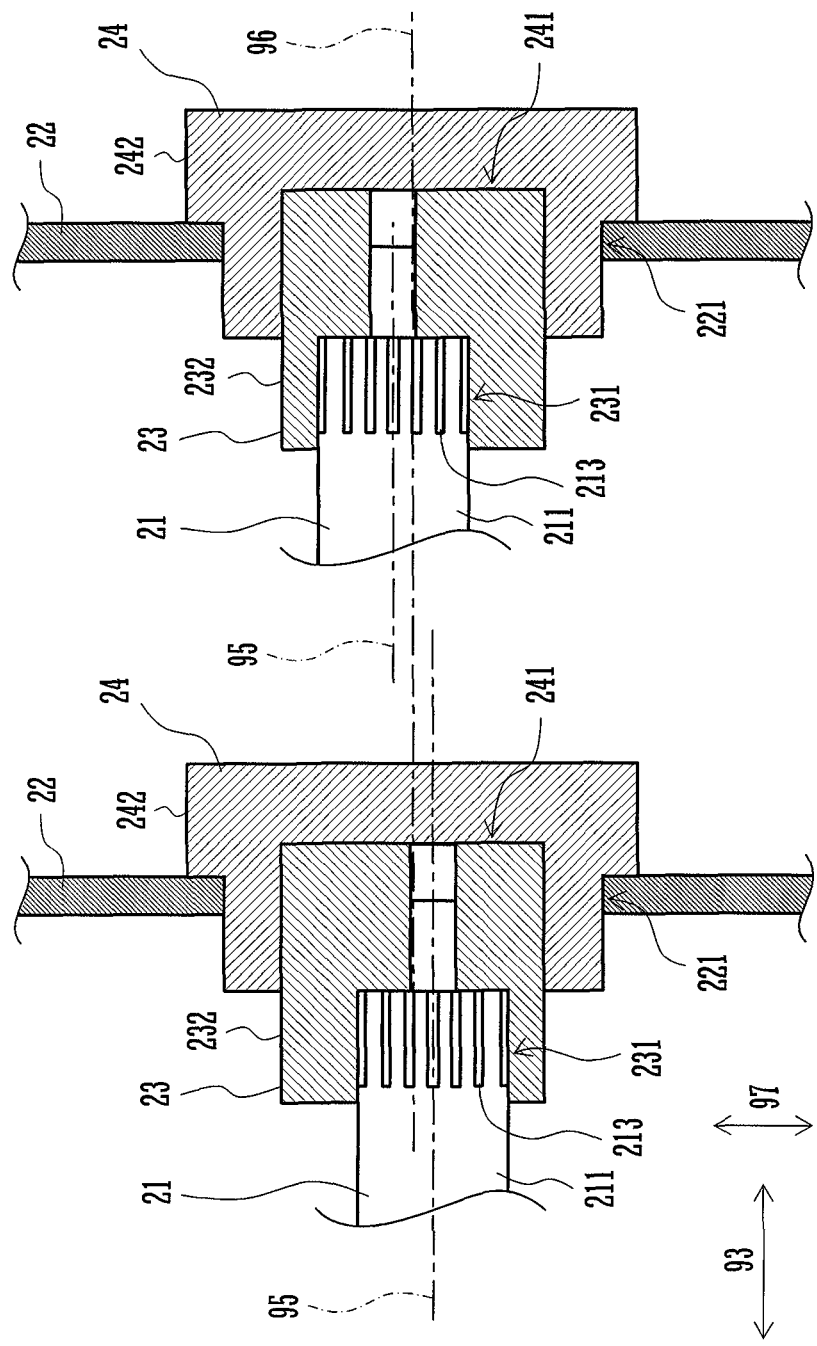
FIG. 5A is a sectional view of the part of the intermediate transfer unit assembled with the engaging protruded portion positioned on the underside.
FIG. 5B is a sectional view of the part of the intermediate transfer unit assembled with the engaging protruded portion positioned on the upper side.

As shown in FIG. 5A and FIG. 5B, the first end portion 211 of the shaft 21 of the intermediate transfer belt idle roller 53 fits into the first concave portion 231 of the joint member 23. After the shaft 21 has fitted into the first concave portion 231, because the engaging protruded portion 233 and the engaging concave portion 213 engage with each other, the joint member 23 is constrained from rotating around the first axis 95 in relation to the shaft 21.

Besides, as described above, the first concave portion 231 and the first peripheral portion 232 are eccentric between each other. When inserted into the through hole 221, the supporting member 24 is held at the predetermined position in the apparatus frame 22 in the adjustment direction 97. Moreover, the intermediate transfer belt drive roller 52 is not displaced in relation to the apparatus frame 22. Therefore, the joint member 23 does not rotate around the first axis 95 in a state where it is fitted onto the shaft 21.

For this reason, a position of the first end portion 211 of the shaft 21 in the adjustment direction 97 is adjusted depending on an angle around the first axis 95 at which the shaft 21 is fitted into the first concave portion 231. That is to say, the position of the first end portion 211 of the shaft 21 in the adjustment direction 97 is adjusted by fitting the first concave portion 231 onto the first end portion 211 of the shaft 21 after having adjusted an angle of the first concave portion 231 with respect to the first end portion 211 of the shaft 21 around the first axis 95, and then by inserting the first peripheral portion 232 into the second concave portion 241; and meandering of the intermediate transfer belt 51 is suppressed thereby.

Further, when a replacement of the intermediate transfer belt 51 is made, the joint member 23 is removed from the supporting member 24 in a state where it is fitted onto the shaft 21, and is inserted into the supporting member 24 again after the replacement of the intermediate transfer belt 51. In doing so, the joint member 23 and the shaft 21 are not disassembled; and thus because the joint member 23 does not rotate around the first axis 95 in the state where it is fitted onto the shaft 21, the position of the first end portion 211 of the shaft 21 in the adjustment direction 97 is not changed before and after the replacement of the intermediate transfer belt 51. Accordingly, the position of the intermediate transfer belt idle roller 53 can be restored correctly in the adjustment direction 97 perpendicular to the conveyance direction 94 of the intermediate transfer belt 51 between the intermediate transfer belt drive roller 52 and the intermediate transfer belt idle roller 53 when the replacement of the intermediate transfer belt 51 is made.

Therefore, by once adjusting the position of the intermediate transfer belt idle roller 53 in the adjustment direction 97 so that the intermediate transfer belt 51 does not meander, the position of the intermediate transfer belt idle roller 53 does not deviate when the replacement of the intermediate transfer belt 51 is made, and thus meandering of the intermediate transfer belt 51 can be suppressed.

Additionally, because the first concave portion 231 is configured in such a manner that the shaft 21 is fittable thereinto at a plurality of angles stepwise around the first axis 95, the position of the shaft 21 in the adjustment direction 97 can be adjusted stepwise; therefore, the rotation of the first concave portion 231 in relation to the shaft 21 around the first axis 95 is securely constrained.

Further still, in a case where a need occurs to readjust the position of the shaft 21 in the adjustment direction 97, the position of the shaft 21 in the adjustment direction 97 can be readjusted easily by first disassembling the joint member 23 once from the shaft 21, and then by fitting the joint member 23 onto the shaft 21 after having changed the angle of the joint member 23 around the first axis 95. As well, in a case where there is no need for readjusting the position of the shaft 21 in the adjustment direction 97, sticking the joint member 23 and the shaft 21 together using some adhesive or the like can prevent the occurrence of a situation where the shaft 21 and the joint member 23 are disassembled by a mistaken operation when the replacement of the intermediate transfer belt 51 is made.

Subsequently, variant embodiments of the joint member 23 are explained.

Figure 6:
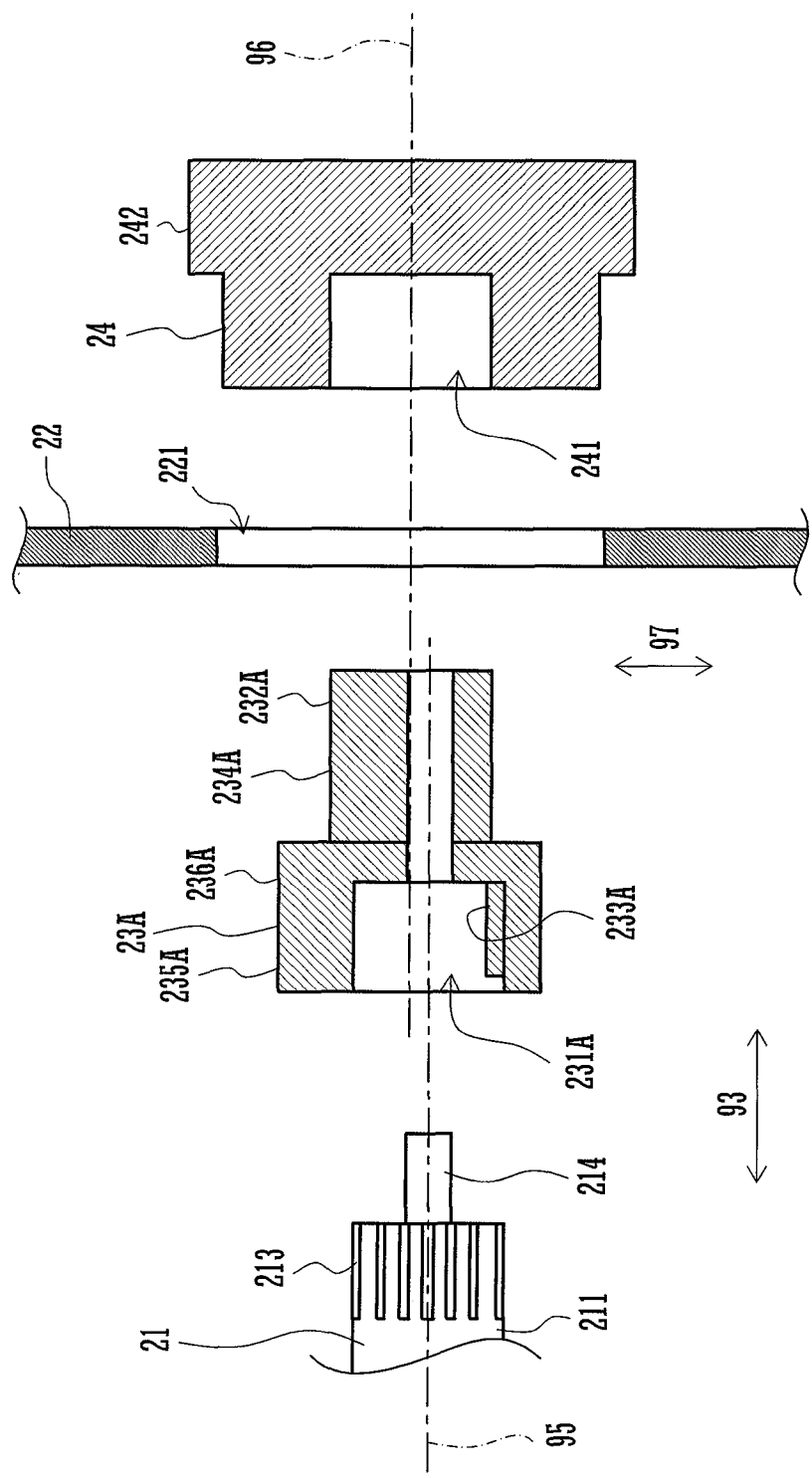
FIG. 6 is a sectional view of a disassembled state of a part of an intermediate transfer unit according to another embodiment.
Figure 7:
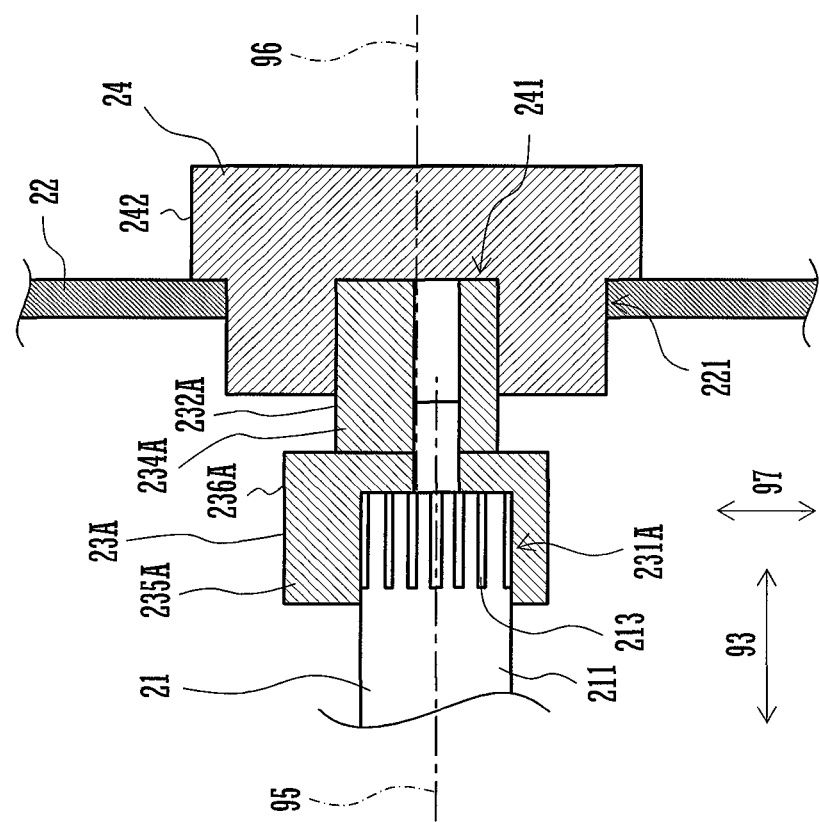
FIG. 7 is a sectional view of the part of the intermediate transfer unit shown in FIG. 6 in its assembled state.

As shown in FIG. 6 and FIG. 7, a joint member 23A according to a first variant embodiment includes a first joint portion 234A and a second joint portion 235A. The first joint portion 234A has a first peripheral portion 232A. The second joint portion 235A is disposed adjoining the first joint portion 234A in the longitudinal direction 93, and has a second peripheral portion 236A with a diameter different from that of the first peripheral portion 232A, and a first concave portion 231A. The first concave portion 231A is provided with an engaging protruded portion 233A capable of engaging with the engaging concave portion 213. As an example, the diameter of the first peripheral portion 232A is smaller than the diameter of the second peripheral portion 236A. In the joint member 23A, the second peripheral portion 236A is formed concentrically with the first peripheral portion 232A. That is to say, the first concave portion 231A is eccentric with respect to the second peripheral portion 236A.

A position of the shaft 21 in the adjustment direction 97 is adjusted by fitting the second joint portion 235A onto the shaft 21 after having adjusted an angle around the first axis 95, and then by inserting the first joint portion 234A into the supporting member 24. When the replacement of the intermediate transfer belt 51 is made, the first joint portion 234A is detached from and attached to the supporting member 24 in a state where the second joint portion 235A is fitted onto the shaft 21. Because the first joint portion 234A and the second joint portion 235A are eccentric, and because diameters of their respective peripheral portions 232A and 236A are different, a direction of eccentricity of the joint member 23A becomes easily recognizable by a user, which in turn makes it easy for a user to perform the positioning of the shaft 21 in the adjustment direction 97.

Figure 8:
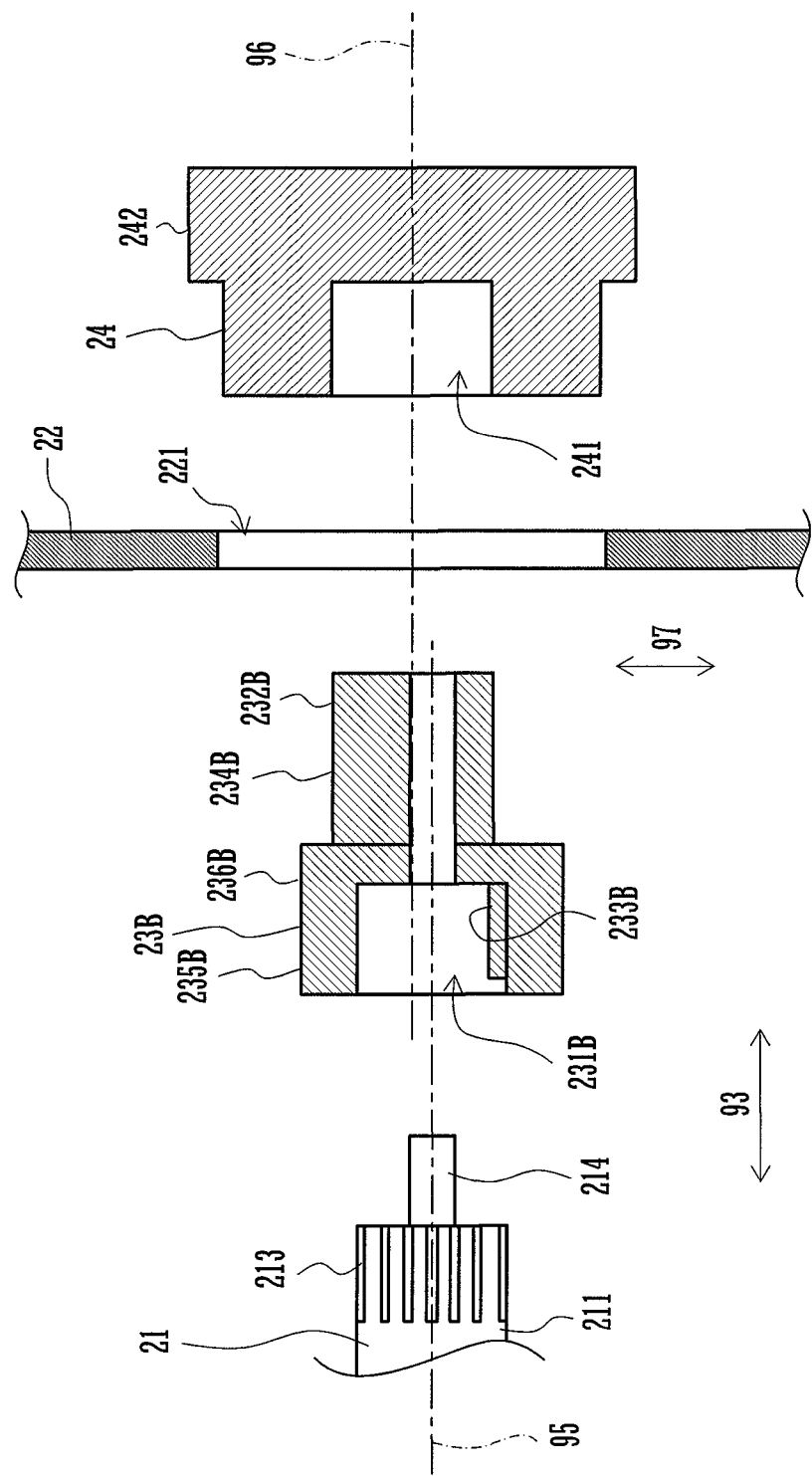
FIG. 8 is a sectional view of a disassembled state of a part of an intermediate transfer unit according to still another embodiment.
Figure 9:
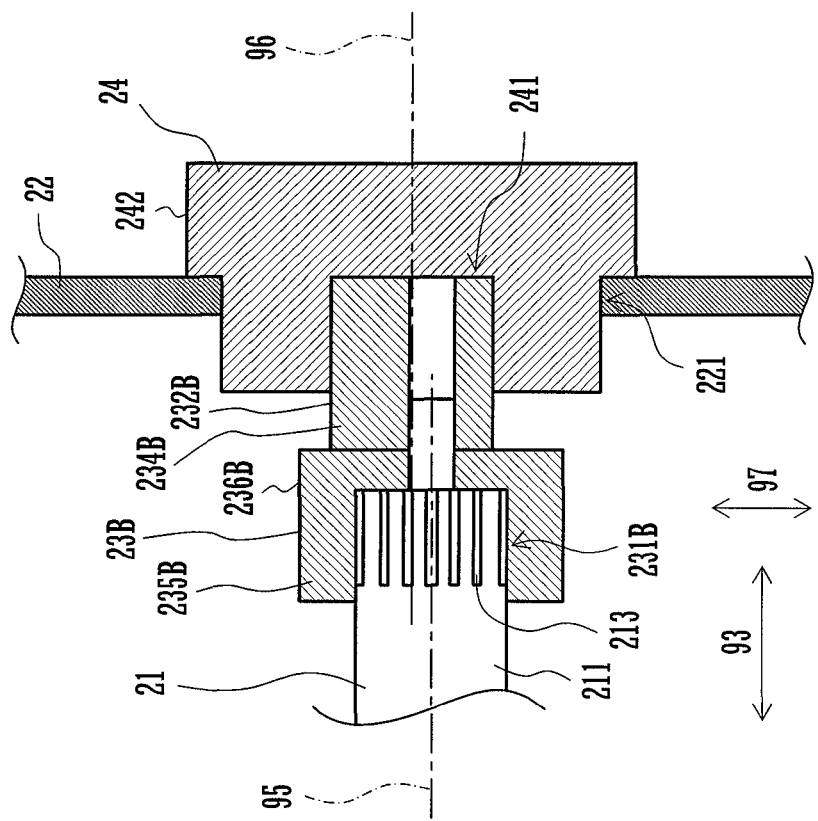
FIG. 9 is a sectional view of the part of the intermediate transfer unit shown in FIG. 8 in its assembled state.

As shown in FIG. 8 and FIG. 9, a joint member 23B according to a second variant embodiment includes a first joint portion 234B and a second joint portion 235B. The first joint portion 234B has a first peripheral portion 232B.

The second joint portion 235B is disposed adjoining the first joint portion 234B in the longitudinal direction 93, and has a second peripheral portion 236B with a diameter different from that of the first peripheral portion 232B, and a first concave portion 231B. The first concave portion 231B is provided with an engaging protruded section 233B capable of engaging with the engaging concave portion 213. As an example, the diameter of the first peripheral portion 232B is smaller than the diameter of the second peripheral portion 236B.

That is to say, the joint member 23B is configured in the same manner as the joint member 23A except that the second peripheral portion 236B and the first concave portion 231B are formed concentrically, and that the first peripheral portion 232B and the second peripheral portion 236B are eccentric between each other.

Since the first peripheral portion 232B is eccentric with respect to the second peripheral portion 236B, a position of the shaft 21 in the adjustment direction 97 is adjusted depending on an angle around the first axis 95 at which the joint member 23B is fitted onto the shaft 21.

Further, the first concave portions 231, 231A, 231B may be configured in such a manner that the shaft 21 is fittable thereinto at any angle continuously around the first axis 95. This allows a finer adjustment of the position of the shaft 21 in the adjustment direction 97.

For example, a configuration can be such that the first concave portions 231, 231A, 231B are each provided with a female thread, and that the first end portion 211 of the shaft 21 is provided with a male screw engaging with the female thread. With this configuration, the shaft 21 is screwed into the respective first concave portions 231, 231A, 231B until a desired angle is reached around the first axis 95, and then the respective joint members 23, 23A, 23B and the shaft 21 are stuck together by some adhesive or the like. This allows a finer adjustment of the position of the shaft 21 in the adjustment direction 97.

Additionally, the second concave portion 241 may be a through hole.

Further still, the belt conveyance device of the present invention can be applied to the secondary transfer unit 60, and to other belt conveyance devices rotating an endless belt that is passed over a plurality of tension rollers and tensioned therewith.

The above explanations of the embodiments are nothing more than illustrative in any respect, nor should be thought of as restrictive. Scope of the present invention is indicated by claims rather than the above embodiments. Further, it is intended that all changes that are equivalent to a claim in the sense and realm of the doctrine of equivalence be included within the scope of the present invention.

What is claimed is:

1. A belt conveyance device comprising:
    a shaft rotatably supporting an idle roller as one of a plurality of tension rollers which an endless belt is passed over and tensioned with;
    a joint member including:
        a first concave portion into which one end portion in a longitudinal direction of the shaft is fittable at a plurality of angles around a first axis of the shaft, and
        a first peripheral portion having a second axis that is parallel to but does not share the same straight line with the first axis;
    an apparatus frame having a through hole penetrating in the longitudinal direction; and
    a supporting member having a second concave portion which the first peripheral portion is attachable to and detachable from at a plurality of angles around the second axis, the supporting member being insertable into and removable from the through hole in the longitudinal direction and being held at a predetermined position in the apparatus frame in a direction perpendicular to a conveyance direction of the endless belt between the plurality of tension rollers when inserted into the through hole.

2. The belt conveyance device as claimed in claim 1, wherein the joint member comprises:
    a first joint portion having the first peripheral portion; and
    a second joint portion that is disposed adjoining the first joint portion in the longitudinal direction and that has a second peripheral portion with a diameter different from that of the first peripheral portion, and the first concave portion.

3. The belt conveyance device as claimed in claim 2, wherein the second peripheral portion is formed concentrically with the first peripheral portion.

4. The belt conveyance device as claimed in claim 2, wherein the second peripheral portion is formed concentrically with the first concave portion.

5. The belt conveyance device as claimed in claim 1, wherein the first concave portion is configured in such a manner that the shaft is fittable thereinto at a plurality of angles stepwise around the first axis.

* * * * *